United States Patent [19]

Gibson et al.

[11] 4,284,987

[45] Aug. 18, 1981

[54] SLOPE STABILITY WARNING DEVICE FOR ARTICULATED TRACTORS

[75] Inventors: Harry G. Gibson; Benjamin C. Thorner, both of Morgantown, W. Va.; Jack W. Thomas, LaGrande, Oreg.

[73] Assignee: The United States of America as represented by the Secretary of Agriculture, Washington, D.C.

[21] Appl. No.: 73,474

[22] Filed: Sep. 7, 1979

[51] Int. Cl.[3] .............................................. G08B 21/00
[52] U.S. Cl. .................................... 340/689; 33/264; 33/366; 33/391; 180/282; 116/DIG. 13; 200/61.52; 340/52 H; 340/684; 340/685
[58] Field of Search ...................... 340/52 H, 689, 684, 340/685; 200/61.52; 116/DIG. 13; 33/391, 366, 283, 264; 180/282; 280/466 R, 6 R

[56] References Cited

U.S. PATENT DOCUMENTS

| | | | |
|---|---|---|---|
| Re. 27,899 | 1/1974 | Burgin | 340/689 |
| 2,773,953 | 12/1956 | Lawick . | |
| 3,359,550 | 12/1967 | Christensen . | |
| 3,701,093 | 10/1972 | Pick . | |
| 3,798,594 | 3/1974 | Funk . | |
| 3,846,781 | 11/1974 | Smith | 340/684 |
| 3,921,128 | 11/1975 | Snead . | |
| 4,016,535 | 4/1977 | Dinlocker . | |

OTHER PUBLICATIONS

Gibson, H. G. et al., "Slope Stability of Logging Tractors and Forwarders", *Transactions of the ASAE* vol. 17, No. 2, 1974, pp. 245-250.
Gibson, H. G. et al., "Side Slope Stability of Articulated-Frame Logging Tractors", *Journal of Terramechanics*, vol. 8, No. 2, pp. 65-79, 1971, Great Britain.

*Primary Examiner*—Glen R. Swann III
*Attorney, Agent, or Firm*—M. Howard Silverstein; David G. McConnell

[57] ABSTRACT

A tip-over warning system for vehicles of the articulated type utilizes a swinging pendulum pivoted in a frame which is mounted on and simulates the stability triangle of the vehicle. The pivotal connection of the pendulum is at a scale distance relative to the frame corresponding to the location of the vehicle center of gravity. The side arms of the frame are variable in length and pivoted, allowing the apex of the frame to move. The apex is moved by a servo motor in accordance with the steering angle of the vehicle. The pendulum and frame are connected in an electrical circuit including a current source and an alarm device. When the pendulum touches a side arm of the frame the circuit is completed, thus energizing the alarm device.

20 Claims, 9 Drawing Figures

SLOPE STABILITY WARNING DEVICE FOR ARTICULATED TRACTORS

FIELD OF THE INVENTION

This invention relates to vehicle safety systems, and more particularly to a warning device for giving an alarm of impending tip-over of a tractor or similar vehicle.

BACKGROUND OF THE INVENTION

Various devices for providing tilt indications for vehicle have been proposed in the prior art. These devices include gravity switching arrangements, such as a body of mercury moving relative to spaced contacts or a swinging conductive pendulum moving in a conducting ring which cooperates with the pendulum to form a switch which is normally open but which closes to energize a warning device when the vehicle reaches a dangerous attitude.

The prior art devices are primarily concerned with non-articulated vehicles, and also do not take into consideration the additional tilt hazards which develop when the vehicle is steered while travelling on a slope. In other words, the prior art devices consider the vehicle to have a substantially fixed stability triangle under all operating conditions. This is not true, especially in the case of articulated vehicles, such as articulated tractors, loaders, forwarders, and other articulated vehicles wherein the center of gravity becomes displaced from its straight-away normal position when the vehicle is frame-steered.

The prior art devices also do not consider the effects on vehicle stability of differences in loading of the vehicle, namely, changes in tilting moments resulting from different loads carried by the vehicle.

Examples of such prior devices are shown in the following prior U.S. patents of interest:
Lawick, U.S. Pat. No. 2,773,953
Christensen, U.S. Pat. No. 3,359,550
Pick, U.S. Pat. No. 3,701,093
Funk, U.S. Pat. No. 3,798,594
Snead, U.S. Pat. No. 3,921,128
Dinlocker, U.S. Pat. No. 4,016,535

Also of interest in showing the background of the present invention are the following publications:

Gibson et al, "Side-slope Stability of Articulated-frame Logging Tractors", Jour. of Terramechanics, 8:(92), Pergamon Press, Oxford, England, 65–79, 1971.

Gibson et al, "Stability of Logging Tractors and Forwarders", ASAE Paper No. 71-611, presented at Winter Meeting, Chicago, Ill., Dec. 7–10, 1971, 19 pp.

SUMMARY OF THE INVENTION

The alarm device of the present invention is intended to serve as a warning instrument to indicate to the operator of an articulated tractor, loader, forwarder, or similar vehicle that the vehicle is on a slope and is of such position that tip-over of the vehicle is imminent. Articulated tractors, forwarders and loaders are tractor-type vehicles that have frames hinged approximately in the middle and are "frame steered", i.e., the front segment of the frame is rotated relative to the rear segment by means of a mechanism operated by hydraulic cylinders. These vehicles are designed in two ways: one design has a pinned front axle permitting one front wheel to ride up and over an obstruction without the frame being affected; the other has a trunnion-type bearing at the hinge point of the frame. When an obstruction is encountered by a front wheel, the front frame section rises on one side with the wheel as it goes over the obstruction. The present invention is particularly applicable to the first type of articulated-frame vehicle (pinned front axle type).

Such an articulated-frame vehicle does not follow the standard pattern of vehicle stability. A solid-frame, pinned front axle vehicle (such as some farm tractors) has essentially a triangular (3-point) stability system, with the pin joint at the front axle defining the raised forward apex of an isosceles triangle, with the rear tire ground contact points defining the rear corners of the triangle. The tractor is stable as long as the center of gravity (CG) vector does not intersect or fall outside the triangle (defined as a "stability triangle"). With an articulated-frame tractor the triangle exists but it changes from an isosceles triangle, at zero steering angle, to an unequal-sided triangle when a steering angle exists. Stability of this type of tractor vehicle varies with slope, steering angle, loading, and position on the slope.

The device of the present invention takes into account the stability characteristics of the articulated-frame, pinned front axle vehicle and the angle of slope to warn of impending upset. With regard to logging tractors (articulated wheeled skidders), or similarly loaded vehicles, consideration is taken of the pull effect of the log load on stability.

Thus, the device is intended as an accessory device on an industrial articulated-frame, pinned front-axle, four wheeled-drive tractor, loader or forwarder (a vehicle which carries a load of logs, etc., in a bunk at the rear of the vehicle). The primary purpose of the device is to warn the operator when he is approaching an unsafe operating situation with his vehicle, where it might upset and where he has sufficient time to move the vehicle to a safe situation. The device is usable on logging tractors, log loaders, log forwarders, farm tractors, or other tractors having an articulated-frame, pinned front axle, four wheeled-drive design.

The device operates on the basic theory that an articulated-frame, pinned front axle vehicle has a "stability triangle" running from the rear tire ground contact points to the pin axis of the front axle, and that the center of gravity (CG) vector intersecting the triangle or falling outside the triangle indicates an unstable condition (tipping impends if it intersects and tipping is in process if it falls outside).

Applying this theory in the present invention, a pendulum is fastened to a moving frame at a scale distance corresponding to the CG location of the associated articulated vehicle. The pendulum is made part of an electrical circuit by circuit means connecting it to one pole of a battery. A scaled stability triangle assembly is located in scale relationship to the pendulum on the vehicle and is connected to the other pole of the battery. The circuit means includes an alarm device such as a bell, a warning lamp, or other suitable warning device. When the pendulum touches the stability triangle assembly it energizes the alarm device.

The stability triangle assembly is constructed in such a way as to change with the steering of the associated vehicle, i.e., as the vehicle is steered left, the stability triangle assembly skews left, etc. The stability triangle assembly is arranged to always have its base (rear side) parallel to the rear axle of the associated vehicle. This can be accomplished by mounting the alarm device on the rear frame section of the vehicle in fixed position thereon, or by providing a servo automatic device-orienting system to always keep the device oriented parallel to the rear axle if the device is mounted on the vehicle front frame section.

Undue bouncing of the pendulum is prevented by suspending the pendulum in electrical transformer oil or other suitable liquid of viscosity sufficient to dampen the oscillation of the pendulum. Vanes are provided on the pendulum to further restrict its movement.

Accordingly, a main object of the invention is to provide an improved anti-tip-over warning device for tractors which overcomes the deficiencies and shortcomings of previous devices known or proposed for use as vehicle tip-over warning devices.

A further object of the invention is to provide a tip-over warning device for articulated vehicles which utilizes a changeable stability triangle assembly reflecting the changes caused by steering the vehicle.

A still further object of the invention is to provide an improved tip-over warning device for articulated vehicles which employs a simulated stability triangle assembly cooperating with a pendulum depending therein, and wherein the sides of the simulated stability triangle assembly are changed in length responsive to vehicle steering, with the rear side of said triangle assembly maintained fixed in length and parallel to the rear axle of the associated vehicle.

A still further object of the invention is to provide an improved tip-over warning device for articulated-frame, pinned front axle vehicles wherein a simulated stability triangle assembly is employed wherein the lengths of the sides of the stability triangle assembly change when steering takes place, cooperating with a depending pendulum in the triangle assembly, and wherein the pulling effects of the vehicle load are taken into account in adjusting the shape of the triangle assembly.

A still further object of the invention is to provide an improved tip-over warning device for an articulated-frame, pinned front axle vehicle wherein a simulated stability triangle assembly and a depending pendulum extending therein are employed to define an upset warning switch, wherein the triangle assembly is adjusted in shape in accordance with the steering of the associated vehicle, and wherein the pendulum is provided with means to dampen its movement to avoid undue bouncing or oscillations thereof.

BRIEF DESCRIPTION OF THE DRAWINGS

Further objects and advantages of the invention will become apparent from the following description and claims, and from the accompanying drawings, wherein:

DESCRIPTION OF PREFERRED EMBODIMENTS

Figure 1:
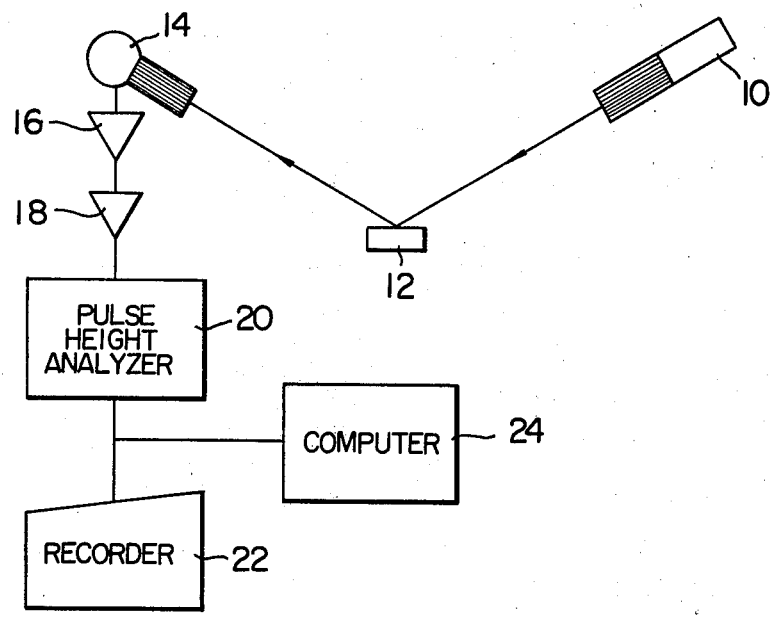
FIG. 1 is a diagrammatic top plan view of a vehicle of the non-articulated type, having a fixed equal-sided stability triangle.

Referring to the drawings, FIG. 1 diagrammatically illustrates a solid-frame, pinned front axle vehicle 11, such as a conventional farm tractor of the non-articulated type. This vehicle has an essentially triangular (3-point) stability system wherein the pin joint 12 at the front axle defines the forward apex of the triangle and the two rear tire ground contact points define the rear corners 13 and 14 of said triangle. The vehicle is stable as long as the vector extending vertically downwardly from the center of gravity CG does not intersect or fall outside the stability triangle defined by the apex 12 and the rear corner points 13 and 14.

Figure 2:
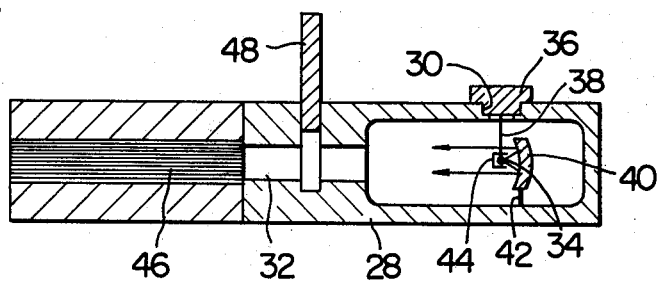
FIG. 2 is a diagrammatic top plan view of an articulated-frame, pinned front axle vehicle with a stability triangle whose shape changes with steering and a center of gravity which shifts with steering, said vehicle having a tip-over warning device according to the present invention, shown mounted on its rear frame section.

With an articulated-frame tractor, such as is shown diagrammatically at 15 in FIG. 2, a stability triangle exists, defined by the pin joint 12' and the rear tire contact points 13' and 14', but it changes from an isosceles triangle at zero steering angle to an unequal-sided triangle when a steering angle exists. Thus, in FIG. 2 the articulated vehicle 15 is steered to the left, moving the front apex point 12' to the left and moving the center of gravity CG also to the left from its zero steering angle position. Thus, the stability of the articulated type of tractor varies with the slope, steering angle, and the position of the vehicle on the slope.

As above mentioned, the present invention takes into account the stability characteristics of an articulated-frame, pinned front axle vehicle 15, and the slope angle, along with the steering angle, to warn of impending upset. For example, FIG. 2 shows a tip-over warning device 16 mounted on the rear frame section 17 of the vehicle 15. The vehicle steering wheel, shown at 18, is mounted on the front frame section 19.

Figure 3:
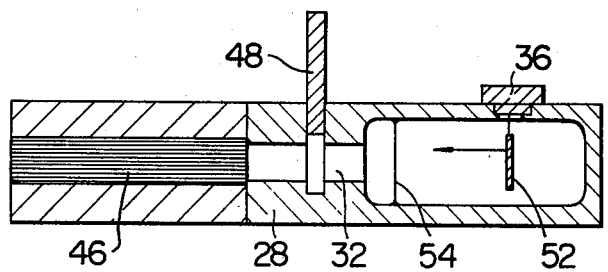
FIG. 3 is a fragmentary, partly diagrammatic, perspective view of an improved tip-over warning device for an articulated-frame vehicle such as that shown in FIG. 2, said warning device being constructed in accordance with the present invention.
Figure 4:
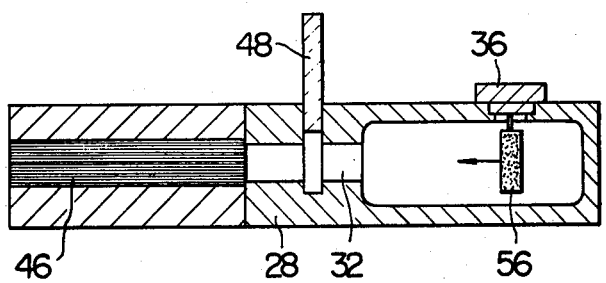
FIG. 4 is a fragmentary enlarged top plan view of the forward portion of the simulated stability triangle assembly and cooperating parts employed in FIG. 3.
Figure 5:
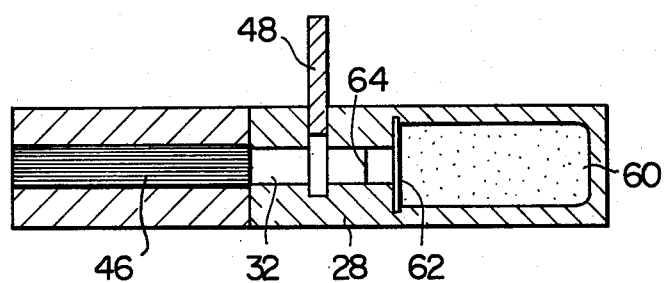
FIG. 5 is a fragmentary enlarged vertical cross-sectional view taken substantially on the line 5—5 of FIG. 4.

The device 16 (FIG. 3) is provided with triangle-defining means simulating the vehicle stability triangle defined by the corner points 12', 13', 14', and scaled so as to be similar thereto, and with a freely swingable pendulum 20 depending into said triangle-defining means from a point corresponding to the CG point and in scale relationship thereto. The device 16, as shown in FIGS. 3, 4 and 5, comprises a leakproof housing 21 containing suitable damping liquid, such as transformer oil, or other suitable liquid of similar viscosity. Upstanding rear post members 22, 23 are rigidly secured on the housing bottom wall 24' and are spaced to represent the rear leg, or base, of the simulated vehicle stability triangle. This spacing is fixed, and the device 16 is mounted so that the rear leg defined by the spaced post members 22, 23 is parallel to the fixed rear wheel contact point leg defined between the rear corner points 13', 14' in FIG. 2.

The post members 22, 23 have top pins 24, 25 forming pivots for respective metal sleeves 26, 27 which have insulating end pivot rings 28, 29 rotatably supported on said post members and receiving the pins 24, 25. Telescopically engaged in the sleeves 26, 27 are respective metal rods 30, 31 provided at their ends with insulating pivot rings 32, 33. Pivotally engaged through and having bearing collars 40, 41 (FIG. 4) rotatably supporting the insulating rings 32, 33 is the depending vertical end arm 34 of a drive arm 35 rigidly connected to the shaft 36 of a slave Selsyn motor 37 rigidly mounted inside housing 21. Slave motor 37 is electrically coupled to and is driven by an externally mounted Selsyn driving motor 38 gearingly coupled by 1:1 gearing to the steering wheel 18.

A vertical shaft member 42 is supportingly journalled at 43 on bottom wall 24' rearwardly of and between the post members 22, 23 and has a long horizontal top arm 44 slidably engaged through a block 45 having a lateral pivot lug 46 located above rings 32, 33 and receiving the depending arm 34. An insulating slide sleeve 47 is slidably mounted on arm 44. Sleeve 47 is connected by a link arm 48 to the intermediate portion of a transverse stationary bridging bar 49 secured to the top ends of opposite upstanding post members 50, 51 rigidly secured to bottom wall 24'.

The pendulum 20 has a metal supporting stem 52 which is pivotally connected to slide sleeve 47 by a ball joint 53. Stem 52 is provided with damping vanes 54.

The metal rods 30, 31 are electrically connected together by a flexible insulated wire 55. The metal sleeve 27 is connected by a flexible insulated wire 56 to one terminal of a battery 57. The opposite terminal of said battery is connected through an alarm device 58 and a flexible insulated wire 59 to the top end portion of pendulum rod 52.

The alarm device 58 may be a bell, signal lamp, buzzer, or other suitable warning device. Said device 58 becomes energized when pendulum rod 52 comes into contact with either of the conductive side arms defined by sleeve 27 and rod 31 or sleeve 26 and rod 30. This occurs when the combination of slope and steering conditions generates instability approaching a tip-over state. The alarm is given early enough to allow the operator to take preventive action.

Figure 6:
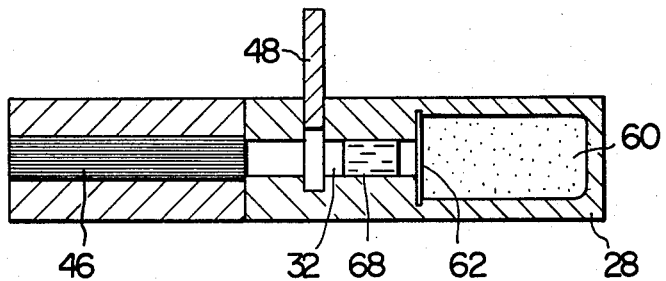
FIG. 6 is a fragmentary top plan view, partly schematic, of an articulated-frame, pinned front axle vehicle provided with a tip-over warning device according to the present invention, pivotally mounted on the front frame section of the vehicle.
Figure 1:
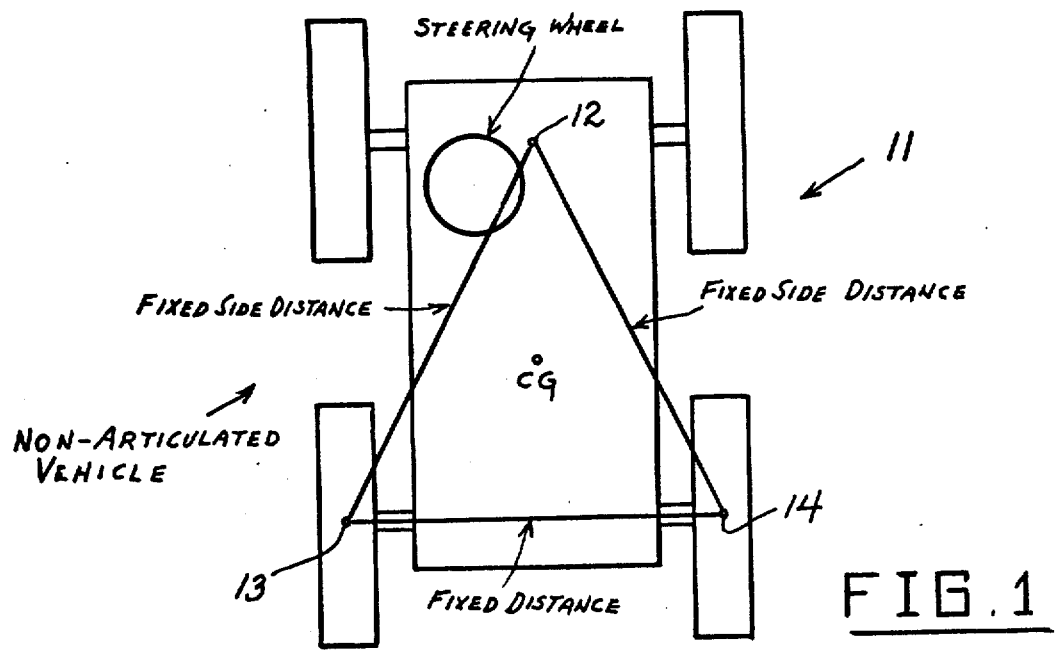
Figure 2:
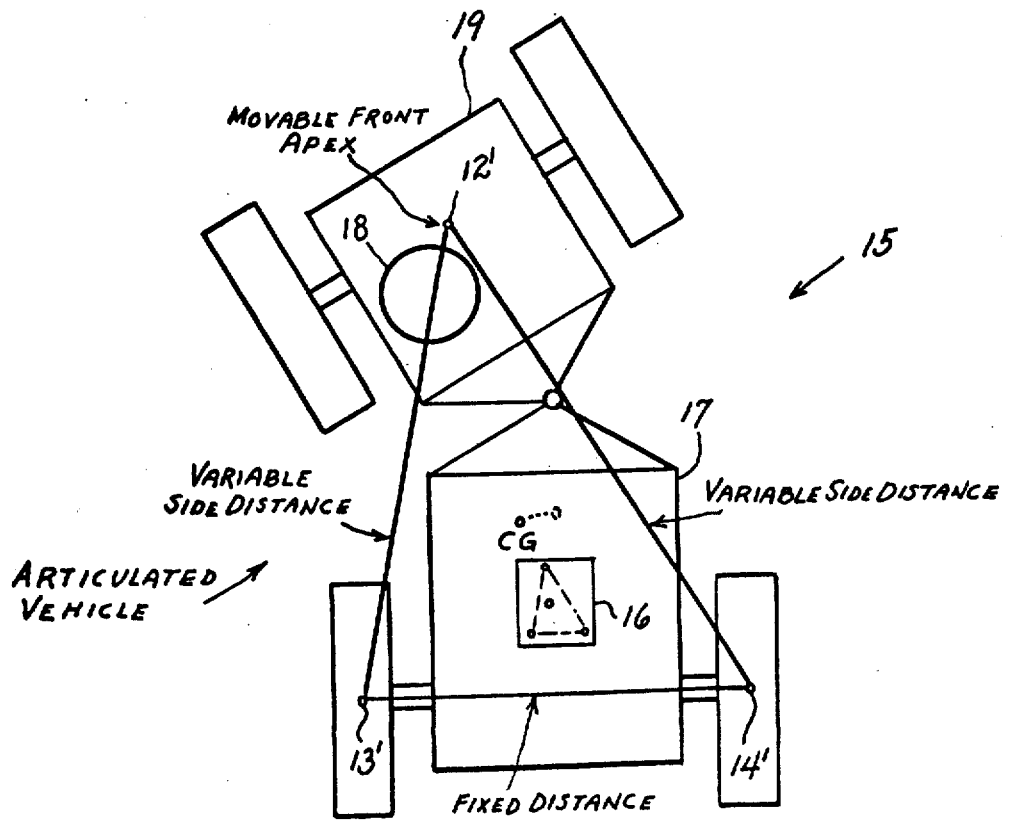
Figure 3:
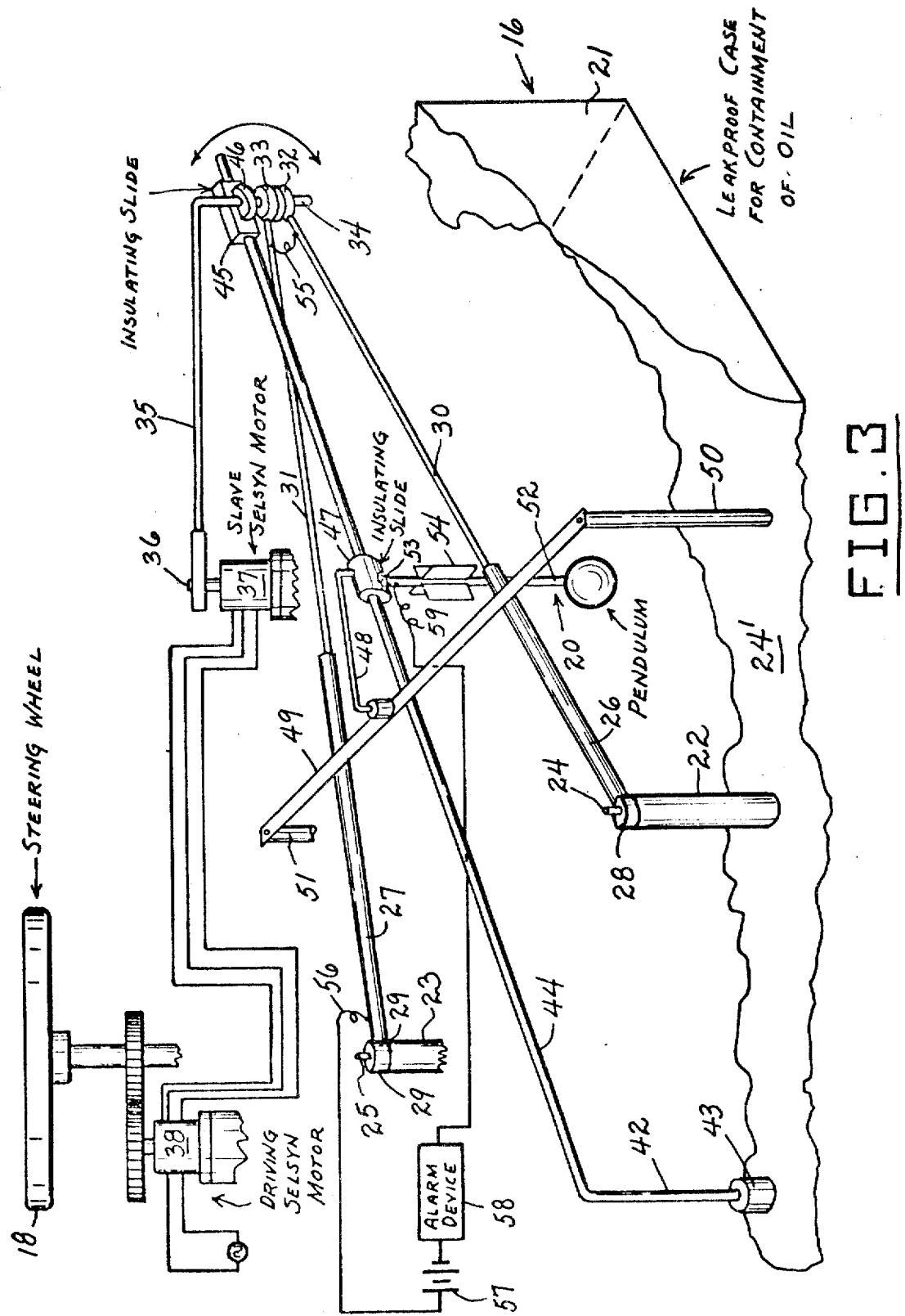
Figure 4:
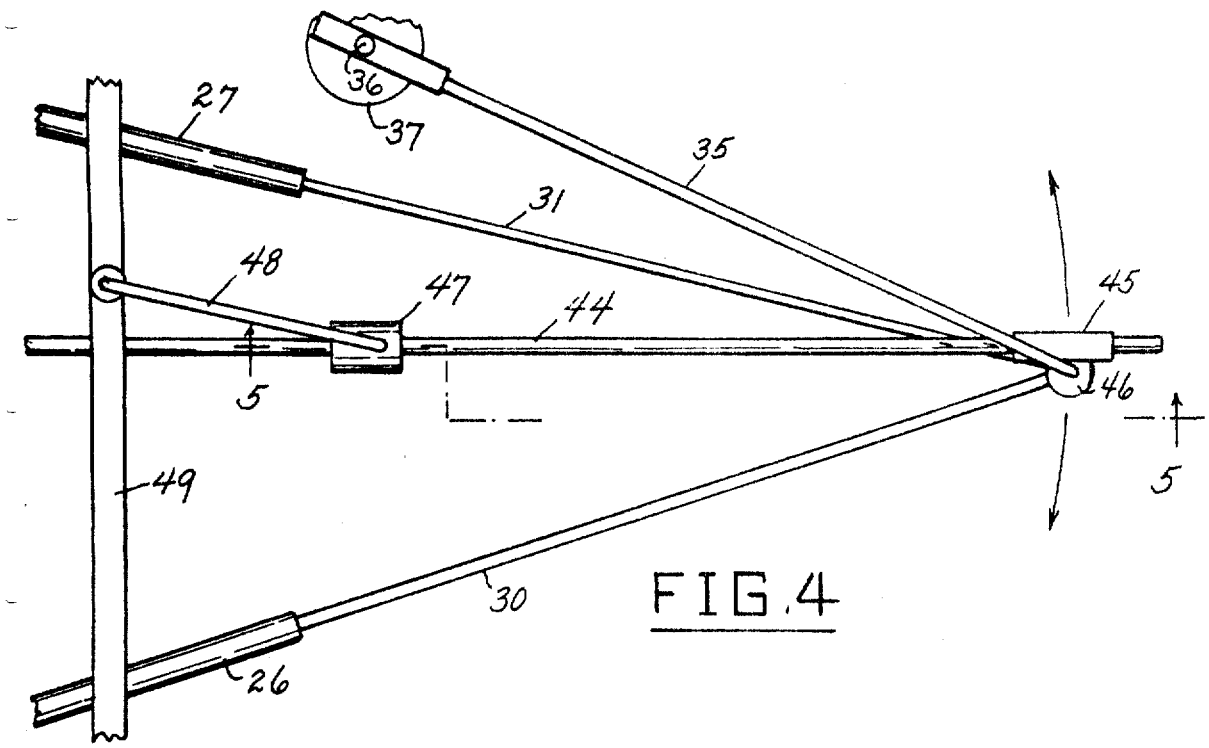
Figure 5:
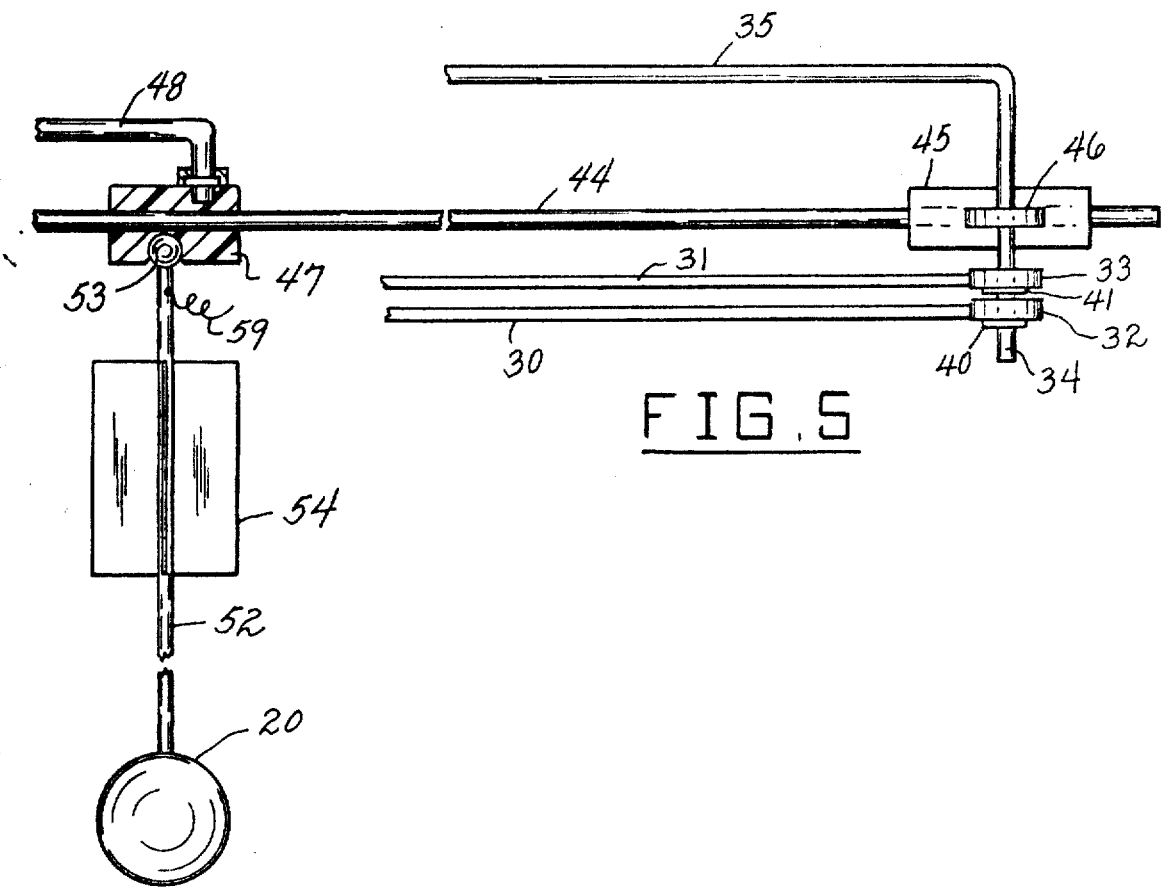
Figure 6:
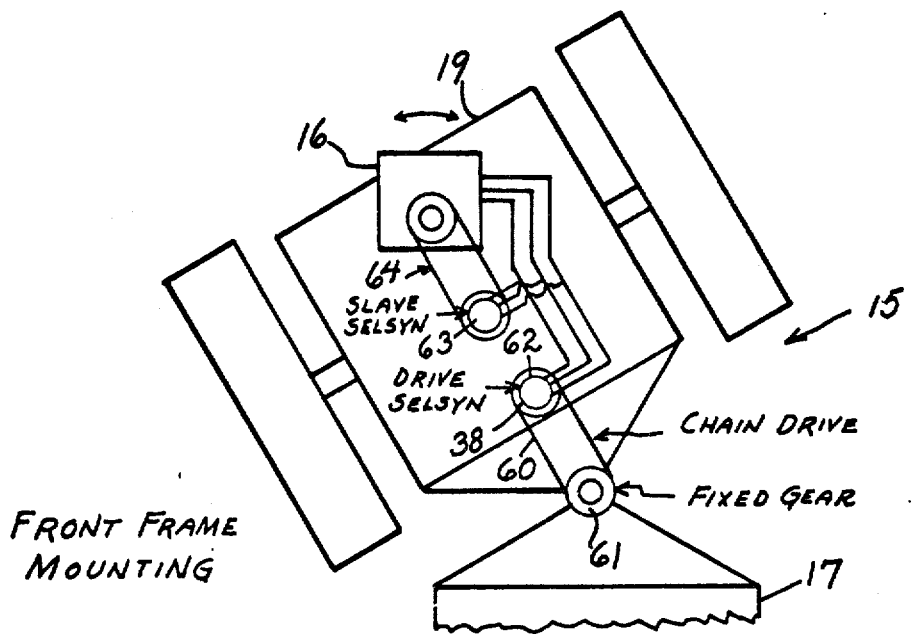

In the alternative arrangement of FIG. 6, the tip-over warning device 16 is pivotally mounted on the front frame section 19 of the articulated vehicle 15. In this arrangement the orientation of the device 16 is always maintained such that the base leg of the simulated stability triangle is parallel to the actual base leg defined by the rear tire contact points 13', 14' of FIG. 2. This may be accomplished by transmitting the steering angle to the driving Selsyn motor 38, which is mounted on front frame section 19, by a drive chain coupling including a drive chain 60 drivingly engaging a fixed gear 61 on the rear frame section 17 at the pivotal connection between the vehicle frame sections and the driving gear 62 of the Selsyn motor 38. A slave Selsyn motor 63, electrically driven by the drive Selsyn motor 38, is coupled to the warning device 16 by a drive chain coupling assembly 64.

In the arrangement of FIG. 6, the synchro transmitter 38, operated by the steering angle drive chain 60 sends a signal to the slave Selsyn motor 63 representing the angle that the front frame section of the vehicle has shifted in relation to the rear frame section. This in turn rotates the device 16 and the simulated stability triangle contained therein so as to always maintain the same parallel orientation of the rear leg of the simulated stability triangle with the rear wheel axis of the vehicle.

Figure 7:
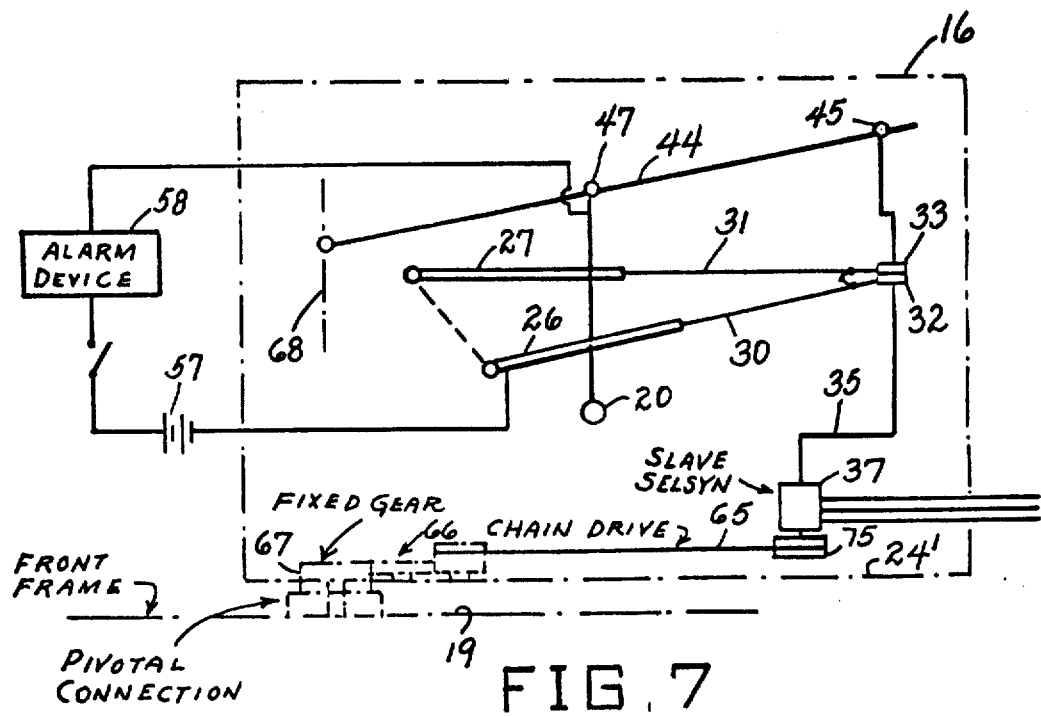
FIG. 7 is a schematic diagram of a tip-over warning device according to the present invention, employing a single slave servo motor for adjusting the shape of the simulated triangle assembly and the orientation of the device responsive to vehicle steering.

FIG. 7 illustrates diagrammatically, and somewhat in perspective, another possible arrangement for maintaining this orientation where the tip-over warning device is pivotally mounted on the front frame. The required orientation of the device 16 may be maintained by transmitting the steering correction angle signal from the driving Selsyn motor 38 to the slave Selsyn motor 37 and then transmitting the resultant mechanical steering angle to the pivotally mounted device 16 but in a reverse direction. Thus, the steering correction angle may be transmitted by a gear 75 and drive chain 65 to a gear train 66 journalled to the bottom wall 24' of the housing, whose output gear is in mesh with a gear 67 rigidly mounted on the front frame section coaxially with the pivotal connection of the device 16 to the front frame section. The gear train 66 is arranged so that a counterclockwise rotation of rings 33,32 around the rotational axis 68 of arm 44, corresponding to leftward steering, as in FIG. 6, will be accompanied by a clockwise rotation of device 16 relative to front frame section 19, and vice versa. Therefore the desired control of orientation of the device 16 may be accomplished by the use of a single slave Selsyn motor 37.

It will be noted that the vehicle center of gravity point CG shifts with the changes in the stability triangle. The shifting of the vehicle center of gravity is simulated by the constrained movement of the slide 47 on the radius arm 44. The shaft 42 is located on a simulated vehicle center line, namely, in a plane of symmetry with respect to the rotational axes of the changeable-length lateral sides of the simulated vehicle stability triangle, i.e., with respect to the post members 22, 23. At zero steering angle (zero articulation) the arm 44 and link 48 extend along said simulated vehicle center line. Thus, the position of pendulum 20 substantially corresponds with that of the vehicle center of gravity relative to its current stability triangle. The alarm circuit will close when the position of the pendulum 20 (corresponding to that of the vehicle center of gravity vector) relative to the simulated stability triangle approaches the upset condition (the CG vector intersects or falls outside of the vehicle stability triangle).

Figure 8:
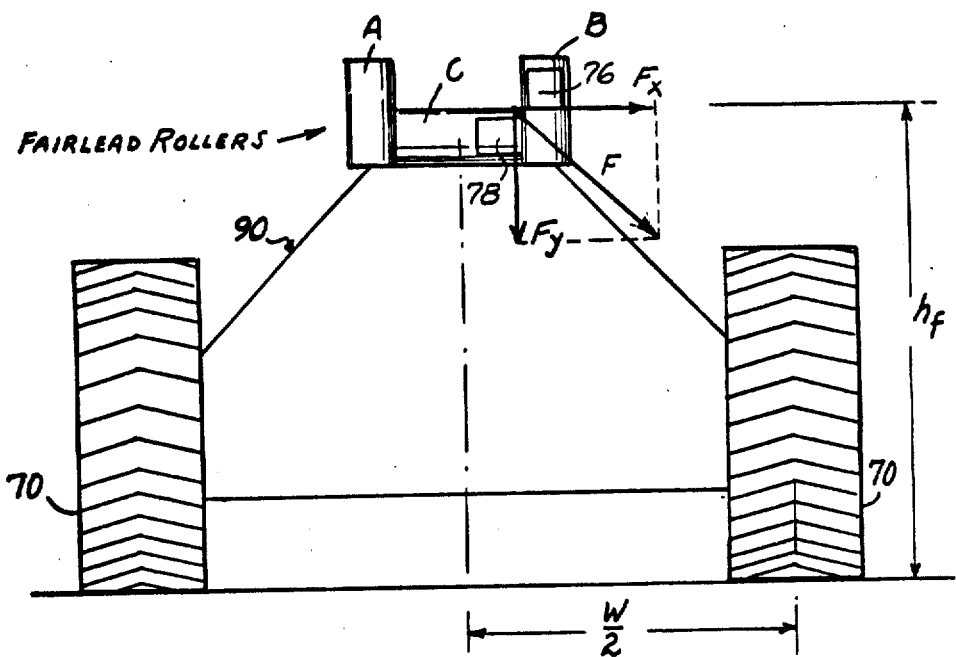
FIG. 8 is a diagram showing the components of load-induced moments which could affect the stability of an articulated vehicle of the log skidder type when operating on a slope.

In the case of certain articulated vehicles, such as logging tractors (articulated wheeled skidders), or other articulated vehicles pulling a substantial load, consideration must be made of the effect on vehicle stability of the pulled load. FIG. 8 shows a schematic rear elevational view of a typical well-known vehicle of this type, mentioned and described in pages 241–244 and 375–380 of "Logging and Pulpwood Production", by J. Kenneth Pearce and George Stenzel, John Wiley and Sons, New York, Library of Congress Card No. 73-190210. The following is a quotation from page 242 of this text:

"Certain manufacturers have developed a very effective and efficient skidding unit in the small size class (6000 to 10,000 pounds in weight, and developing up to 50 horsepower), which has gained rather wide acceptance in logging circles, particularly in pulpwood harvesting. Basically the unit consists of a compact, articulated frame, rubber-tired skidder. Four-wheel drive and a short turning radius enables sit to maneuver around stumps and obstacles and climb moderately steep slopes with little trouble. A light bulldozer-type blade, while listed as optional equipment by certain producers, is useful to clear obstacles from skid roads and move logs at the landing area. Instead of a trailing-sulky or -arch attachment, the lifting effect is provided by means of an integral arch. Individual manufacturers have certain features which identify their particular machine. For example, the Garrett Tree Farmer, as do certain other makes, accommodates itself to the terrain by an oscillating action in the front wheels. The front axle is cradled so that either wheel is free to ride approximately three feet higher than the other, which tends to keep all four wheels in even contact with the ground, thereby providing better traction and stability."

The following is a quotation from page 375 of said text:

"These machines are generally termed wheel skidders.—The center-pin steering gives the wheel skidder greater maneuverability between trees than front wheel steering."

In FIG. 8, the "integral arch" is generally designated at 90.

A specific industrial example of a forwarder or prehauler of this type is the Franklin Model 132/170 XL-N Pack-A-Back, made by Franklin Equipment Co., Franklin, Virginia. Another example is a wheel skidder (or wheeled skidder, also known as a "rubber-tired skidder"), Franklin Model 132, made by the same manufacturer. FIG. 8 is a schematic rear view of such a "rubber-tired skidder". The integral arch carries the cable from the winch to the logs (which are the vehicle load), and forces from this cable act on the machine through the arch 90. These forces can tend to upset the tractor. FIG. 8 shows how these forces act on the integral arch of the tractor and tend to tip the tractor over if the logs are off to one side of the longitudinal axis of the tractor (thus constituting lateral tipping forces). Sensors (load cells) such as transducers 76, 78 may be suitably mounted so as to detect the lateral tipping forces and send their signals to the main warning device.

In the typical logging tractor represented in FIG. 8, the fairlead rollers A, C and B are spaced in relation to the supporting wheels 70, 70 substantially as shown diagrammatically in said Figure.

The load force can be resolved such that the rollers A and B are subjected by the load to $F_x$, or horizontal lateral upset force and the roller C is subjected to $F_y$, or vertical force only. The upset force equation for the loading is $$F_x(h_f) - F_y(w/2) = V_F$$

where $F_x$ is the lateral component of upset force, $h_f$ is the fair-lead height, representing the effective moment arm for $F_x$, $F_y$ is the vertical force component exerted by the pulled load, w is the track width, and $V_F$ is the resultant upset moment. If the $V_F$ moment is negative, then it is a restoring moment and acts to stabilize the tractor.

Suitable force-responsive conventional electrical transducer means 76, 78 may be employed to measure the load forces acting on the fair-lead rollers. The upset moment may be computed electrically by suitable circuit means and employed to drive a correction signal. This may be used to drive a servo motor 82 mounted on the bridging member 49 and having a drive arm 83 pivotally connected to slide 47 in place of link arm 48. The signal applied to the servo motor 82 acts to move the slide 47, carrying the pendulum, in a direction corresponding to the resultant upset moment developed by the load, thereby affecting the point at which the upset alarm device 58 is energized.

Various types of conventional transducer means 76, 78 may be employed to generate the respective load component signals. Electronic constants can be used to incorporate the distances $h_f$ and w/2 (fairlead height and one-half the track width). If the computed resultant moment $V_F$ is negative, then it is a restoring moment and acts to stabilize the tractor. As an example, the transducer means 76 at roller B may be either a cell of the type arranged to directly generate an electrical signal as the lateral force component $F_x$ develops, or a suitable Wheatstone bridge with strain gage elements in its legs. The transducer means 78 at the roller C may be similar, such as a Wheatstone bridge with strain gage elements in its legs. The transducer means 78 at roller C may be connected so as to subtract from the signal generated by the transducer means 76 at B. If the resultant moment (and corresponding resultant electrical signal) has a value corresponding to upset conditions, then the simulated center of gravity point in the warning device (slider 47 and pendulum 20) is shifted by motor 82 closer to the side of the simulated stability triangle. If the resultant moment is stabilizing, the slider and pendulum 20 are shifted closer to the center of the simulated stability triangle.

Figure 9:
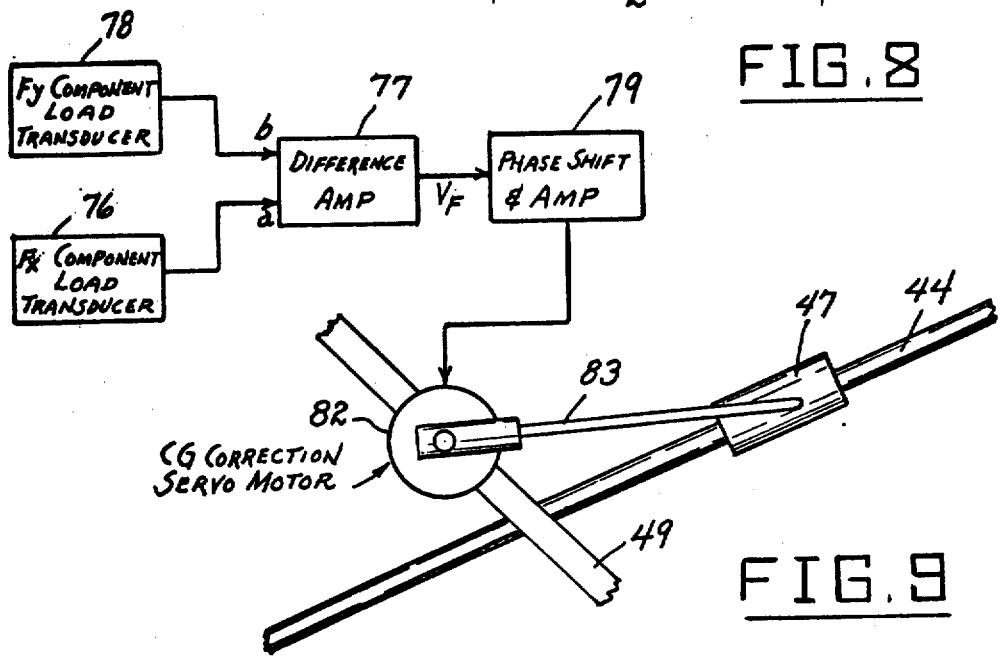
FIG. 9 is an enlarged fragmentary top plan view, partly in schematic block form, showing an arrangement in a tip-over warning device of the present invention for taking into consideration possible instability developed by the load-induced moments of FIG. 8.

The load-correction computing means therefore may comprise a system shown in block form in FIG. 9, wherein the side pull component block 76 for $F_x$ employs Wheatstone bridge circuitry with strain gages arranged to respond at roller B and furnishes a signal to the input a of one side of a differential amplifier 77. The $F_y$ component block 78 may employ similar circuitry, employing strain gages at roller C, and furnishing a signal to the input b of the other side of the differential amplifier 77. The quantity $h_f$ may be the amplification constant of the a side of amplifier 77 and the quantity w/2 may be the amplification constant of the b side of said amplifier. This provides the computation for deriving a resultant moment signal $V_F$. The $V_F$ signal is delivered via a conventional phase shift and amplifier unit 79 to the CG correction servo motor 82.

Within the spirit of the present invention, other types of conventional servo units may be employed instead of Selsyn motors and circuitry, such as hydraulic units and circuits, mercury contact arrangements, and electronic circuitry employing other servo components.

The rear leg portion of the vehicle stability triangle need not be simulated, since a tractor of the type herein considered could never climb a slope of such steepness as to cause it to tip over backward. Also, the simulated triangle assembly can be shortened to give a warning when the vehicle is at a percentage grade such as to cause it to slide before it tips.

The warning device can be made entirely adjustable so as to be compatible with any present factory-made skidder or tractor. It also can be made with electronic equivalent circuits and integrated circuits. The parameters are selected or pre-set to limits less than required for tipping to permit the alarm to become energized well before a critical point is reached.

While certain specific embodiments of improved stability warning devices for articulated vehicles have been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. A vehicle of the pinned front axle type having pivotally-connected front and rear frame sections and having a stability triangle with forwardly convergent lateral sides and a fixed transverse rear leg, and including a tip-over warning means mounted on said vehicle and having simulated stability triangle means with rotatable convergent pivotally connected lateral sides of changeable length and means defining a fixed transverse rear side extending substantially parallel to the fixed transverse rear leg of the vehicle stability triangle, pendulum means swingably mounted on said tip-over warning means at a suspension location relative to the simulated stability triangle means substantially corresponding to the location of the vehicle center of gravity with respect to its stability triangle, said pendulum means depending through said simulated triangle means, means to change the lengths of said convergent pivotally connected sides responsive to relative pivoting of said vehicle frame sections, an alarm device, and means to energize said alarm device responsive to contact of said pendulum means with one of said changeable-length sides.

2. The vehicle of claim 1, and wherein said tip-over warning means is pivotally mounted on the vehicle and is provided with means to move said warning means so as to maintain the fixed transverse rear side of the simulated stability triangle means parallel to the fixed transverse rear leg of the vehicle stability triangle whenever the vehicle frame sections rotate relative to each other.

3. The vehicle of claim 2, and wherein said tip-over warning means is mounted on the front vehicle frame section.

4. The vehicle of claim 1, and wherein the tip-over warning means is mounted on the rear vehicle frame section.

5. The vehicle of claim 1, and wherein said tip-over warning means is provided with means to dampen the movements of said pendulum means.

6. The vehicle of claim 1, and wherein said tip-over warning means is provided with a housing containing the pendulum means and the convergent changeable-length sides of the simulated triangle means, said housing containing damping fluid.

7. The vehicle of claim 1, and wherein said vehicle includes steering means to rotate said frame sections relative to each other, and wherein said means to change the lengths of said convergent sides comprises servo means coupling the convergent ends of said changeable-length sides to said steering means.

8. The vehicle of claim 1, and wherein said vehicle is provided with servo means developing signals in accordance with steering rotations of the frame sections relative to each other, and wherein said means to change the lengths of said convergent sides acts in accordance with said signals.

9. The vehicle of claim 1, and means to move the suspension location of said pendulum means substantially in accordance with the movement of the vehicle center of gravity which occurs when the vehicle frame sections are pivoted relative to each other.

10. The vehicle of claim 1, and wherein said means to change the lengths of said convergent pivotally connected sides comprises means to generate electrical signals responsive to pivoting of the vehicle frame sections relative to each other, and means to arcuately move the point of convergence of said pivotally connected sides in accordance with said electrical signals.

11. The vehicle of claim 1, and wherein said lateral sides of the simulated stability triangle means each comprises a plurality of coaxial telescoping segments.

12. The vehicle of claim 1, and elongated radius rod means pivoted on the warning means, and means pivotally connecting said radius rod means to the convergent ends of the changeable-length sides of the simulated stability triangle means.

13. The vehicle of claim 12, and wherein said radius rod means is pivoted on the warning means substantially in a plane of symmetry with respect to the rotational axes of the changeable-length sides.

14. The vehicle of claim 12, and wherein the means pivotally connecting said radius rod means to said convergent ends comprises a sliding block on the radius rod means, and pin means coupling said sliding block to said convergent ends.

15. The vehicle of claim 14, and wherein said means to change the lengths of said convergent sides comprises rotary drive means connected to said pin means, and means to actuate said rotary drive means responsive to relative pivoting of the vehicle frame sections.

16. The vehicle of claim 1, and elongated radius rod means pivoted on the warning means, means pivotally connecting said radius rod means to the convergent ends of the changeable-length sides of the simulated stability triangle means, and means adjustably supportingly connecting said pendulum means to said radius rod means.

17. The vehicle of claim 16, and wherein said connecting means comprises a slide member on said radius rod means, means pivotally suspending said pendulum means from said slide member, and means limiting sliding movement of said slide member on the radius rod means substantially in accordance with the movements of the vehicle center of gravity resulting from vehicle steering.

18. The vehicle of claim 17, and wherein said warning means includes a fixed portion and said means limiting sliding movement comprises link means connecting said slide member to said fixed portion of the warning means.

19. The vehicle of claim 18, and wherein said vehicle is provided with load force-responsive means to detect tip-over moments due to vehicle loading, and means to rotate said link means in accordance with activation of said moment-detection means.

20. The vehicle of claim 1, and load force-responsive means on the vehicle to detect tip-over moments due to vehicle loading, and means to adjust the suspension location of said pendulum means relative to said simulated stability triangle means in accordance with the activation of said moment-detection means.

* * * * *

UNITED STATES PATENT AND TRADEMARK OFFICE
CERTIFICATE OF CORRECTION

PATENT NO. : 4,284,987  Page 1 of 6
DATED : August 18, 1981
INVENTOR(S) : Harry G. Gibson et al.

It is certified that error appears in the above—identified patent and that said Letters Patent is hereby corrected as shown below:

Figures 1-9 should appear as shown on the attached sheets.

Signed and Sealed this

Twenty-third Day of March 1982

[SEAL]

Attest:

GERALD J. MOSSINGHOFF

Attesting Officer  Commissioner of Patents and Trademarks